Feb. 20, 1951  N. R. JENNINGS  2,542,142
CONTOUR DELINEATING MECHANISM
Filed Oct. 22, 1945
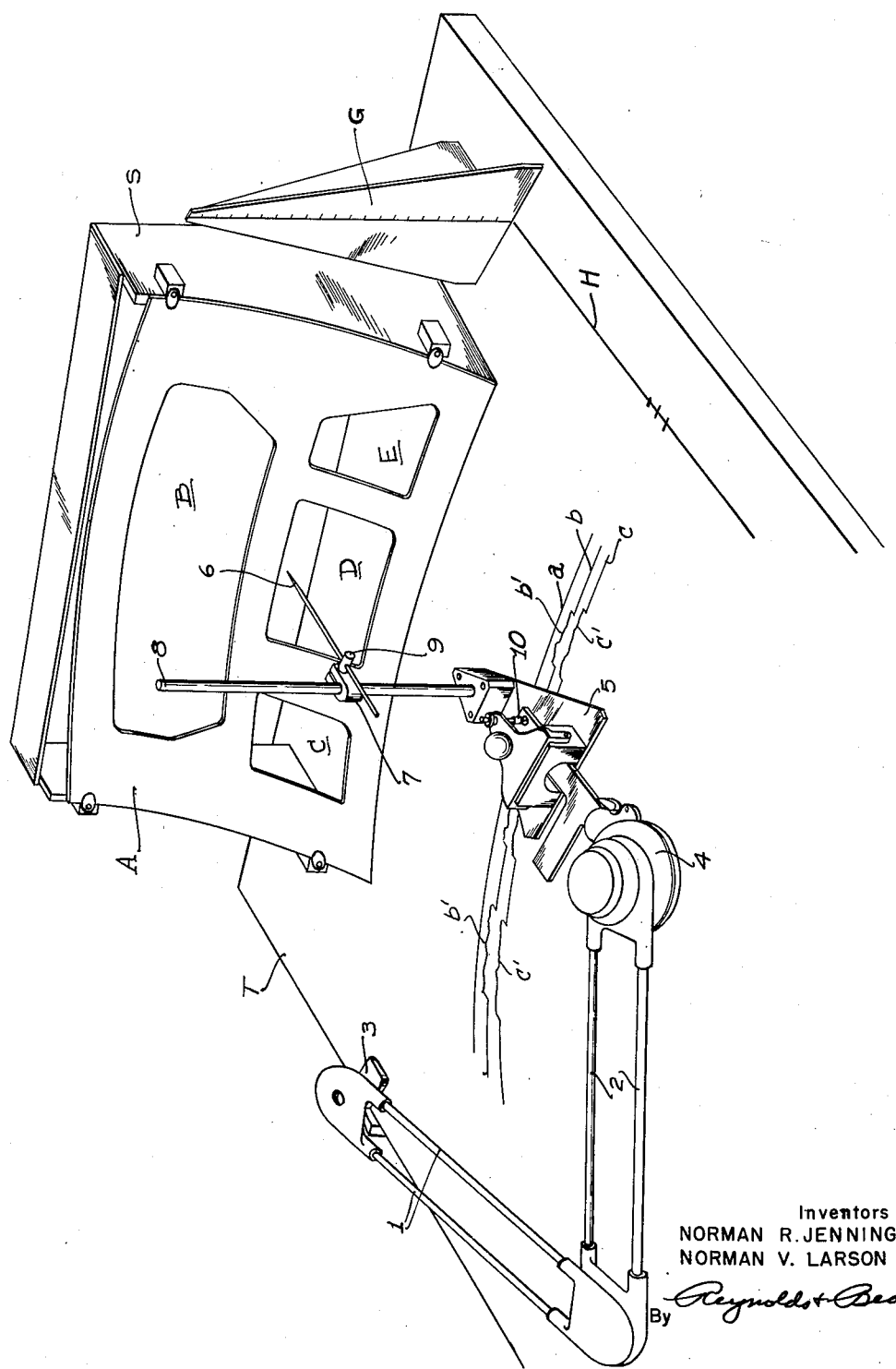
Inventors
NORMAN R. JENNINGS
NORMAN V. LARSON
By *Reynolds & Beach*
Attorneys Patented Feb. 20, 1951

2,542,142

UNITED STATES PATENT OFFICE 2,542,142

CONTOUR DELINEATING MECHANISM

Norman R. Jennings, Auburn, and Norman V. Larson, Seattle, Wash., assignors to Boeing Airplane Company, a corporation of Delaware Application October 22, 1945, Serial No. 623,764

2 Claims. (Cl. 33—41)

In aircraft manufacture, a part is often first formed as a mock-up, or as a full-size or reduced-scale plaster or wooden model, in order that its surfaces may be faired into adjoining surfaces, or in order that its aerodynamic characteristics may be those desired, or for some other purpose. The shape of the part having been thus determined by trial and error, as it were, it becomes necessary to reproduce the part, or portions thereof, in final practicable form for use and assembly. Such reproduction, in aircraft manufacture, usually takes the form of a supporting framework and a sheet-metal skin or fairing.

While reproductions in the form of dies can be made directly from full-size models, there are disadvantages inherent in this procedure, not the least of which is the necessity of preserving and storing these large and heavy dies so that exact reproductions can be made in the future. Better practice is to reproduce the shape of the part in the form of a drawing, from which the part can be reproduced at any time.

The making of a drawing of a part which has complex curves and contours, and which may have abrupt interruptions of such curved surfaces, as by windows or other apertures, has heretofore been a tedious job of laying out or simulating contour lines upon the surface, and then of measuring from a reference plane at many points along such contour lines. Accuracy was in proportion to the closeness of the contour lines and of the individual measurements therealong. Of course, in the case of scale models, such measurement of contour lines has been the only practicable way of enabling reproduction in full size, and the small scale of the model required unusual precautions to obtain accuracy.

In addition it would be convenient to be able to check the accuracy of reproduced parts from a drawing without need of reversing the tedious process of laying out contours on the object's surface and measuring from a reference.

The present invention concerns apparatus and a method whereby, from a full-size or scale model, or from a previously produced part or object, there can be quickly produced, without measurement and without marking out of contour lines on the part or object, an accurate drawing of representative contours, at whatever intervals desired. Having thus drawn the various contours of the part, the part can be reproduced exactly in the form of the original, at any time. Moreover, if the original is a small-scale model, the contours can be taken directly therefrom, without extensive measurements, and by application of the scale factor the drawn contours can be reproduced in full size, or, by interposition of a proportional pantograph, can be drawn originally in full size directly from the model. It will also be evident that the invention affords the advantage of enabling one quickly to check from the drawn contours the accuracy of a part produced from such contours or by other techniques.

It is an object of the present invention to provide mechanism, and a method, whereby the reproduction of such contours upon a drawing sheet may be greatly simplified, and may be produced directly from the part itself or from a scale model thereof with great rapidity and accuracy.

Also it is an object to provide, in such mechanism and method, means whereby the control contours may be selected at will and may, if desired, be separated and segregated on the drawing sheet to whatever extent may be necessary to distinguish them from other like contours.

It is an object to provide such mechanism and such a method which will accomplish the ends in view regardless of the complexity of the part's surface, provided it does not depart too greatly from a planar surface.

It is an object to accomplish the results desired through the use of readily available devices, such as common drafting machines, meaning by the latter term any suitable device which includes a head constrained to universal movement in the plane of a drafting table or the like.

With these and other objects in mind, as will appear later, the present invention comprises the novel mechanism and the novel method illustrated by the accompanying drawing, described in this specification, and as more particularly defined by the claims.

The drawing is a perspective view of suitable mechanism in process of delineating the contours of a representative surface to be drawn.

The object to be delineated will ordinarily be such as a solid model, or a piece of sheet-metal, having complex contours, and these perhaps interrupted by apertures, which may have irregular shapes. Such an object is illustrated at A in the drawing. The representative sheet there illustrated has lateral and longitudinal curvature, and each such curvature increases progressively toward the lower left hand corner. Likewise, it has a series of apertures B, C, D, and E, at various locations and of various shapes and sizes. It is this object which it is desired to reproduce through the medium of contours drawn upon a drafting sheet placed upon the table top T.

To this end the object A is supported upon, or fixed with respect to, the table T, in a generally upright position. A support S of suitable shape is provided for the purpose, and is herein shown as resting directly upon the top of the table. A vertical gauge G is also shown resting upon the table alongside the support S, or it may be a part of the support. Its purpose is to gauge the vertical contour intervals.

A conventional drafting machine, herein shown as comprised of the articulated pairs of parallel links 1 and 2, is provided with an anchor 3 by which it may be anchored to the table T, and at its outer or movable end terminates in a head 4 which supports normally the rectangularly disposed rulers for drafting upon the table. In the present instance there is supported from the head a base 5 which functionally constitutes a part of the head, and will be so regarded hereafter. This base 5 is suitably and immovably secured relative to the head 4, and upon it is supported a trammel point 6 which projects towards the surface of the object A. The trammel point is vertically adjustable, relative to the head and the table top, as by the clamp 7 movable up or down a post 8 upstanding from the base 5, and the trammel point may also be adjustable, with respect to the head, towards and from the surface of the object A, as by sliding the trammel point within its immediate support 9 upon the clamp 7. Care must be exercised that the tip of the trammel point is not swung horizontally (nor vertically) during any such adjustment. It must always remain precisely parallel to its initial position, as determined by the anchor 3. If this can not be assured by care in fixing the trammel point in alignment with the vertical line on the gauge G during adjustments, or with the horizontal line H in prolongation of the gauge G, or both, splined connections between it and its supports may be found necessary.

Likewise associated with the base 5 and head 4 is a marking tip 10. The head is suitably weighted to an extent to cause the marking tip, in its movement across the table top T, to scribe a line corresponding to the movement of the head.

As will now be apparent, any movement of the trammel point 6 will effect corresponding movement of the marking tip 10, and of the head 4, 5, yet the parallel linkage 1, 2 coupled with the anchorage at 3, will constrain movement of the marking tip and trammel point to universal movement in the plane of or parallel to the table top, so that the head will remain always in precise angular relationship to any given initial position, and so that the marking tip, in moving over the table top and the drawing sheet thereon, will always retain a precise relationship through the trammel point with the contour of the object A which is being swept or contacted by the trammel point. Expressed somewhat differently, the trammel point or rod is constrained to movement bodily into positions always lying parallel to its initial position, so that, in any horizontal plane, the trace on the drawing sheet of the movement of its tip along the surface of the object A is always a true contour line, in exact reproduction of the intersection of the object's surface with the horizontal plane wherein lies the trammel point, the marking or tracing tip bearing a constant relationship on the head to the trammel point.

The procedure is to locate the trammel point at a known elevation above the table, which can be done by reference to the gauge element G, and then to sweep the trammel point in a plane parallel to that of the table top along the surface of the object A. The tip of the trammel point will follow the contour of the surface of the object with fidelity at the selected elevation, and the marking tip 10 with equal fidelity will record that contour on the drawing sheet. Such a contour line, which might represent the surface of the article A below the apertures C, D, and E, is represented by the contour line a. The trammel point is then adjusted to a different elevation, and if this does not sufficiently separate the succeeding contour line b from the contour line a— that is, if it is desirable to space the contour lines more widely in order to render each one more distinct, the trammel point may likewise be adjusted lengthwise by a known amount. Again it is swept across the surface of the object A at the new elevation, and now it may enter the apertures C, D, and E in addition to following the surface contour, and the result is a contour line, such as is indicated by the contour b, b'. Again the trammel point is adjusted upwardly, and perhaps also transversely as previously explained, and is swept across the surface of the object A at a third elevation, and the result may be as indicated by the contour lines c, c'. The location of aperture edges is distinct and exact. By continuing thus the entire contour of the surface of the object A is faithfully delineated upon the drawing sheet, merely by the process of sweeping the trammel point across the surface at successive elevations. By recording the changes in contour interval, which may be as closely or as widely spaced as the situation requires, and any changes in lateral spacing, it is possible at any future time to utilize the contour lines such as a, b, and c to lay out templates or dies from which the surface of the object A may be reproduced with exactness.

In tracing contours from full-size parts, to reproduce full-size drawings, the trammel point and the marking tip are made part of a common head, as shown, and are relatively immovable during tracing a contour. Should it be desired to reduce the drawing size from the full-size part, or should it be desired to make the contour traces of larger size from a small-scale model, it is obvious that a proportional pantograph may be interposed between the base 5 (or the trammel point 6) and the marking tip, to increase or to decrease, as the case may require, the size of the contour trace relative to the actual contour of the part or model. Such a pantograph might be interposed, instead, between the trammel point 6 and the head 4, 5.

The present device may also be used in somewhat reverse fashion, to check a finished part with the drawn contours, for accuracy. The manner of using it to this end is obvious, for it is simply a matter of maintaining coincidence of the marking tip and the corresponding contour of the part, or of noting non-coincidence.

We claim as our invention:

1. Mechanism for delineating upon a table top parallel contours of an object having an irregular surface, comprising a support arranged to fixedly support the object with its surface for drawing in generally upright position relative to the table top, a drawing head, means guiding said drawing head for movement always in a plane parallel to the table top while maintaining such head fixedly oriented, a marking tip carried by and movable with the head, disposed in position to engage the table top, a guide post carried by and projecting upwardly from said head, a trammel mount slidably adjustable up and down along said guide post into several different planes parallel to but spaced varying distances from the table top, and a generally horizontal trammel rod slidably adjustable lengthwise of itself in said trammel mount, to vary the horizontal distance between said post, hence said head, and the object generally to enable separation and identification of the different contours drawn on the table top.

2. Mechanism for delineating upon a table top parallel contours of an object having an irregular surface, comprising a support arranged to fixedly support the object with its surface to be drawn in generally upright position relative to the table top, a head movable over the table top, a marking tip carried by and movable with the head, disposed in position to engage the table top, a trammel point fixedly oriented with respect to and movable conjointly with the head, trammel support means including means mounting said trammel point for adjustment relative to the head into several planes parallel to and spaced different distances from the table top, in position to engage and move in each such plane across the object's upright surface, said trammel support means including means for also adjusting the trammel point relative to the mounting means to select the horizontal distance between the object contacting tip of the trammel point and the vertical line passing through the marking tip carried by the head at different selected values, and guide means for said head, guiding the same for movement always in a plane parallel to the table top, and maintaining the trammel point, during such movement, always in its fixed orientation.

NORMAN R. JENNINGS.
NORMAN V. LARSON.

REFERENCES CITED

The following references are of record in the file of this patent:

UNITED STATES PATENTS

| Number | Name | Date |
| --- | --- | --- |
| 450,892 | Potter | Apr. 21, 1891 |
| 1,347,078 | Carman | July 20, 1920 |
| 1,897,407 | Timm | Feb. 14, 1933 |
| 2,305,167 | Kasper | Dec. 15, 1942 |
| 2,352,695 | Clausing et al. | July 4, 1944 |
| 2,358,521 | Langsner | Sept. 19, 1944 |

FOREIGN PATENTS

| Number | Country | Date |
| --- | --- | --- |
| 537,077 | Germany | Oct. 28, 1931 |
| 634,154 | France | Nov. 8, 1927 |
| 638,283 | Germany | Nov. 12, 1936 |